United States Patent [19]

Eklund et al.

[11] Patent Number: 5,905,104
[45] Date of Patent: *May 18, 1999

[54] HEAT RESISTANT POWDER COATING COMPOSITION

[75] Inventors: Wayne G. Eklund, Scandia; Paula Torrejon Ramos; Charles J. Torborg, both of Minneapolis, all of Minn.

[73] Assignee: H. B. Fuller Licensing & Financing, Inc., St. Paul, Minn.

[*] Notice: This patent is subject to a terminal disclaimer.

[21] Appl. No.: 08/960,045

[22] Filed: Oct. 29, 1997

Related U.S. Application Data

[63] Continuation-in-part of application No. 08/751,599, Nov. 18, 1996, Pat. No. 5,684,066, which is a continuation-in-part of application No. 08/567,498, Dec. 4, 1995, abandoned.

[51] Int. Cl.⁶ .............................. C08K 3/10; C08L 83/06
[52] U.S. Cl. ...................... 523/435; 523/466; 525/100; 525/106; 525/103; 525/934; 428/447; 428/413; 428/418; 524/444; 524/456; 524/588; 427/386; 427/387; 106/287.12
[58] Field of Search ..................................... 525/106, 934, 525/100, 103; 106/287.12; 428/447, 413, 418; 523/435, 466; 524/444, 456, 588; 427/386, 387

[56] References Cited

U.S. PATENT DOCUMENTS

| | | | |
|---|---|---|---|
| 4,107,148 | 8/1978 | Fujiyoshi et al. | 528/273 |
| 4,404,042 | 9/1983 | Okada et al. | 148/6.2 |
| 4,446,259 | 5/1984 | Vasta | 523/403 |
| 4,657,963 | 4/1987 | Matsumoto et al. | 524/406 |
| 4,746,568 | 5/1988 | Matsumoto et al. | 428/323 |
| 4,877,837 | 10/1989 | Reising et al. | 525/100 |
| 4,879,344 | 11/1989 | Woo et al. | 525/100 |
| 5,087,286 | 2/1992 | Fukuda et al. | 106/287.16 |
| 5,397,669 | 3/1995 | Rao | 430/108 |
| 5,422,396 | 6/1995 | Daly et al. | 525/106 |
| 5,684,066 | 11/1997 | Eklund et al. | 523/435 |

*Primary Examiner*—Margaret W. Glass
*Attorney, Agent, or Firm*—Nancy N. Quan

[57] ABSTRACT

The invention provides a protective coating composition for use on substrates including steel, aluminum, iron and the like. This composition further provides abrasion resistance, electrical resistance, ultra-violet protection, corrosion resistance and heat resistance. It can be particularly useful for coating high temperature stacks, mufflers, manifolds, boilers, ovens, furnaces, steam lines, heat exchangers, barbecue equipment, cooking utensils and other parts that require such powder coating composition. This composition further provides good initial adhesion.

This invention also provides a powder coating composition containing a hydroxyl-functional silicone resin, a glycidyl-functional acrylic resin and an optional flow control agent.

21 Claims, No Drawings

HEAT RESISTANT POWDER COATING COMPOSITION

CROSS-REFERENCE TO RELATED APPLICATION

This application is a Continuation-In-Part of application Ser. No. 08/751,599, filed Nov. 18, 1996 (U.S. Pat. No. 5,684,066) which is a Continuation-In-Part of application Ser. No. 08/567,498, filed Dec. 4, 1995, abandoned, incorporated herein by reference.

FIELD OF THE INVENTION

The present invention relates to a thermosetting heat-resistant powder coating composition. Specifically, the present composition provides a coating that can be generally applied to articles which are likely to be subjected to elevated temperatures, which coating is resistant to adhesive failure from the article.

BACKGROUND OF THE INVENTION

Powder coating compositions are a well known and established art. A variety of articles are routinely powder coated by dipping or tumbling them in a suspended or static bed of resinous powder coating or by spray or sprinkling. The article on which the coating is applied is then heated to form a cured powder coating. These coatings have been shown to be particularly useful on metal surfaces including steel, aluminum and iron.

Various powder coating compositions are available that have been used in heat-resistant applications. For example, it is known in the art that aromatic epoxy resins are used to provide good heat resistance. Epoxy compositions or epoxy and silicone mixtures have also been used in the industry for the same purpose. An example of a silicone coating composition is shown in U.S. Pat. No. 5,422,396 (Daly et al.). However, this composition, along with the other silicone based powder coating compositions, rely on the condensation of the silicone resin with another resin or itself to form the coating composition.

Additional references which describe the preparation of heat-resistant protective coatings are described below:

U.S. Pat. No. 4,877,837 (Reising et al.) discloses powder-based compositions comprising glycidyl functional acrylic polymers admixed with silicone having hydroxyl functional groups. The compositions may contain additives such as flow agents, outgas agents and filler pigments (i.e. hydrated silicates of aluminum and calcium metasilicate) and are cured at a temperature between 180° C.–200° C.).

U.S. Pat. No. 4,446,259 (Vasta) discloses coating compositions in a liquid carrier, which can be cured at ambient temperatures, comprising glycidyl functional acrylic polymers admixed with a reactive polysiloxane. The coatings may contain additives such as metal oxides, metallic pigments and trace amounts of multi-valent metal ions including tin and zinc. Vasta also discloses fluorocarbon-based powder compositions which are baked at 200° C.–345° C. for about 2 hours to provide a coating 25–75 microns thick.

Other related patents include: U.S. Pat. No. 4,404,042 (Okada et al.); U.S. Pat. Nos. 4,657,963 and 4,746,568 (Matsumoto et al.); U.S. Pat. No. 4,879,344 (Woo et al); and U.S. Pat. No. 5,087,286 (Fukuda et al.).

A drawback with the prior art references relates to the protective coatings appearance and protective nature when elevated temperatures are used to cure high-film-build powder-based compositions. For example, when said compositions are cured at elevated temperatures, condensation and thermal decomposition by-products often generate gases which can form pinholes, cracks and craters in the protective coating. These defects can be detrimental to coating properties including aesthetics, heat resistance and corrosion resistance and typically limit the coating thickness to less than about 100 microns.

In attempting to overcome this disadvantage, users of these silicone based powder coating compositions have to allow for long cure times at low temperatures or perform a controlled cure that occurs by slowly increasing the oven temperature. Some powder coatings comprising silicone resins and its blends also have poor storage stability, i.e., the powder coating composition clumps up, cohesively bonds or sinters within 48 hours of storage.

Another problem which has existed in the application of thermally stable silicone compositions to substrates is that the coating compositions (a coating composition which has been powder coated, with the coating melted and cured to a continuous film at temperatures up to 230° C.) have exhibited poor initial adhesion to the substrates. Even though the adhesion of undamaged coatings to the substrates tends to improve with elevated temperatures during use (e.g., temperatures above 280° C.), damage can occur before such use, and additional curing of the initially coated and cured material is time consuming and expensive for the manufacturer. For example, when thermoset silicone powder coated materials have been dropped or scratched, the coatings may readily peel from the substrate or flake off the substrate. It is desirable to provide a powder coating composition which, in addition to providing good thermal resistance, also provides good initial bond strength to substrates.

There has therefore been a need for a powder coating that provides high heat resistance, does not significantly pit, can be applied with a generally high film build without significantly affecting the coating, and that has good initial bond strength to substrates.

SUMMARY OF THE INVENTION

The invention provides a protective coating composition for use on substrates including steel, aluminum, iron and the like. This composition further provides abrasion resistance, electrical resistance, ultra-violet protection, corrosion resistance and heat resistance. It can be particularly useful for coating high temperature stacks, mufflers, manifolds, boilers, ovens, furnaces, steam lines, heat exchangers, barbecue equipment, cooking utensils and other parts that require such powder coating composition. This composition further provides good initial adhesion.

The present invention is directed to protective coatings formed from powder-coating compositions comprising:

1) at least one polysiloxane, preferably a hydroxyl-functional siloxane; and
2) at least one adhesion promoter.

Unmodified protective silicone coatings have displayed cross-hatch adhesion failure rates of at least about 10–15%, and usually at least about 20% up to as much as 30 or 40%. Silicone resin compositions with adhesion enhancers according to the present invention can display cross-hatch adhesion properties of 5% failure and less, and often display no evidence of failure (0% failure).

The present invention is further directed to protective coatings formed from powder coating compositions comprising:

1) at least one acrylic polymer;
2) at least one polysiloxane; and
3) at least one inorganic compound,
said composition is free of flow agents.

When the composition of the present invention is heated to a temperature greater than about 205° C., it forms a continuous film having a thickness greater than about 100 microns. Surprisingly, these inventive coatings have excellent heat resistant characteristics and pass the tape pull test method after about 500 hours at 340° C. Additionally, the coatings outperform existing products currently available for use as heat resistant protective coatings. It is surmised that some of these unique characteristics can be attributed to the specific inorganic compounds and the temperature at which the powder-based compositions are cured Additionally, an adhesion promoter can also be present. Compositions with such adhesive promoters also display cross-hatch adhesion properties of 5% failure and less, and often display no evidence of failure (0% failure).

In another aspect, the invention discloses a method for the preparation of protective coatings. These methods include coating the articles with a high film build and allowing them to cure by conventional techniques.

Advantageously, a preferred embodiment of the powder coating composition can be cured at a temperature of about 140° C. to about 260° C. with a high film build. A high film build is characterized as a film build (i.e. coating thickness) that is applied at a thickness of at least about 60 microns and preferably at least about 100 microns. The compositions of the present invention may be used as thin coating layers (e.g., about 10 to less than 60 microns) where desired. Furthermore, a benefit of being able to apply this coating at a high film build is to accommodate the variety of geometrical shapes of different articles and to allow for variations in manual spraying of the powder coating composition. These coatings exhibit substantially no pitting.

Another aspect of the present invention is that a powder coating composition comprising silicone resins that was believed to require flow control agents therein to enable formation of continuous and non-pitted coatings, does not require any effective amount of flow control agent and can perform equally well, even with regard to flow characteristics during melt and cure of the coated powder. It is apparently generally accepted in the field that a powder coating composition of silicone resins with acrylic or glycidyl acrylic polymer materials, as the example (and comparative example) of U.S. Pat. No. 5,422,396 requires two flow control agents. A composition comprising the silicone resins, in the absence of an effective amount of flow control agent, is therefore novel and inventive. The preferred powder coating composition of the present invention includes a hydroxyl-functional silicone resin, a glycidyl functional acrylic resin, an inorganic compound and an optional flow control agent, in combination with the adhesion promoter. Particularly preferred embodiments of the present invention include a thermosetting, heat-resistant resinous coating composition, and a coating prepared therefrom that includes about 10 wt-% to about 100 wt-% of a hydroxyl-functional silicone resin which is preferably selected from the group consisting of dimethyl, diphenyl, phenylpropyl and methylphenyl silicone resins, about 0–90 wt-% of a glycidyl functional acrylic or methacrylic resin, an effective amount, preferably about 0.01% to about 10% by weight of an adhesion promoter based on the total polymer content, an inorganic compound, and 0 wt-% to about 3 wt-% of a flow control agent.

The powder coating composition of the present invention can include optional ingredients such as degassing agents, accelerators, fillers, texturizers, plasticizers, flexibilizers, gloss control agents, surfactants and pigments. All percentages used herein are weight percentages based on the total weight of the uncured powder coating composition, unless specifically defined. The adhesion promoters of the present invention should be present in an amount which increases the initial adhesion of the powder coating after melting and curing at temperatures of only up to 240° C.

DETAILED DESCRIPTION OF THE INVENTION

The protective coatings of the present invention are characterized as having increased heat resistance properties and are substantially free of coating defects when elevated film thicknesses are utilized. The coatings are particularly useful on articles which are subjected to elevated temperatures including stacks, mufflers, manifolds, boilers, ovens, furnaces, steam lines, heat exchangers, barbecue equipment, cooking utensils and other articles which are subject to temperatures ranging from about 150° C. to about 540° C.

The compositions of the present invention comprise a silicone resin, in a range from about 20.0% by weight to about 60.0% by weight, and preferably from about 25.0% by weight to about 45.0% by weight, based on the total composition solids. The silicone resin can be any alkyl and/or aryl substituted polysiloxane, copolymer, blend or mixture thereof, the alkyl substitution preferably selected from alkyl groups of 1 to 4 carbon atoms, more preferably 1 to 3 carbon atoms, and most preferably methyl, propyl and the aryl substitution most preferably comprising phenyl groups. The silicone resins are heat stable, preferably they do not decompose up to at least 316° C. (600° F.) when exposed for 90 hours. More preferably they will not decompose when subjected to ambient environmental conditions (e.g., in the presence of air) at 343° C. (650° F.) for two weeks.

The silicone resins useful in the practice of the present invention comprise silicone polymers, such as those prepared from organochlorosilanes (such as methyltrichlorosilane, phenyltrichlorosilane and dimethylchlorosilane), and commercially available materials such as phenylsilicone Silres® 601 or methylsilicone MK, available from Wacker Silicone, Adrien, Mich.), and proplyphenyl Z-6018 or methylphenylsilicone 6-2230 available from Dow Corning, etc. Suitable resins are also described in U.S. Pat. Nos. 3,585,065, 4,107,148, 3,170,890 and 4,879,344, incorporated herein by reference.

Preferably, a hydroxyl-functional polysiloxane is used, with the hydroxyl-functionality up to about 10% by weight, preferably in a range from about 0.5% by weight to about 10.0% by weight, more preferably from about 1.0% by weight to about 7.0% by weight, and most preferably from about 1% to about 4% by weight based on the total polysiloxane solids. The compositions may include hydroxyl-functional organo-siloxanes, said organo-siloxane comprises units, including dimethyl, diphenyl, methylphenyl, phenylpropyl and their mixtures. Examples of commercially available hydroxyl-functional polysiloxanes include Dow Corning® 1-0543, Dow Corning® 6-2230 and Dow Corning® Z-6018 from Dow Corning (Midland, Mich.); Wacker Silres® MK and Wacker Silres® 601 from Wacker Silicone Corp., (Adrien, Mich.); General Electric SR-355 from General Electric (Waterford, N.Y.); and PDS-9931 from Gelest, Inc., (Tullytown, Pa.). Other suitable silicone-based polymers include those described in U.S. Pat. No. 4,107,148 (Fujiyoshi et al.) and U.S. Pat. No. 4,879,344 (Woo et al.), incorporated herein by reference. Said polymers can selfcondense and/or react with glycidyl functional polymers to form a crosslinked network.

Preferably, the adhesion promoter is present from about 0.01% to about 10% by weight of the polymer content of the composition, more preferably from about 0.5% to about 5% by weight, most preferably from about 1% to 5% by weight, to increase initial adhesion and reduce cross-hatch adhesion failure to less than 5%. Cross-hatch adhesion failure is tested by scoring a grid of 5×5 lines spaced apart by 2 mm with a razor blade, applying an acrylate pressure sensitive adhesive tape on a polyester backing against the crosshatching, and quickly removing the tape by pulling at an angle of about 90 degrees. The number of squares of coating which have been removed are then measured. By reducing the cross-hatch adhesion failure (after melting and curing of the silicone resin composition) to less than 5%, a polymeric additive is identified as an adhesion promoter. It has been surprising in the practice of the present invention that typical polymeric additives conventionally used as adhesion promoters (e.g., bisphenol A epoxy resins, Novolac-modified bisphenol A, resols, polyethylene, polypropylene, silane resins, phenolic resins with chlorinated polyolefins and polyethylene terephthalate) did not perform according to the present definition of adhesion promoters or adhesion enhancers.

The useful adhesion promoters of the present invention are, as previously noted, determinable by the test procedures described below. From a compositional standpoint, the preferred chemical classes of adhesion promoters comprise (meth)acrylic polymers and copolymers, including ambifunctional or polyfunctional (meth)acrylic polymers and copolymers, as homogeneous or heterogeneous compositions, blends, mixtures, or melts. The term "(meth)acrylic" is used to encompass both acrylic and methacrylic resins. Acrylate polymers (including copolymers) derived from acrylic acid, methacrylic acid, acrylic anhydride, n-butyl acrylate, n-butyl methacrylate, methyl acrylic acid, methyl methacrylic acid, isobutyl acrylic acid, isobornyl (meth)acrylate, decyl acrylate, lauryl (meth)acrylate, trimethylsilyl(meth)acrylate, methacryloxy-propyltrimethoxysilane, fluorinated acrylates (such as those described in U.S. Pat. No. 5,397,669) and the like are most preferred. Copolymers of these (meth)acrylates, or blends or mixtures of (meth)acrylates as with olefinic resins (e.g., polyethylene and polypropylene), vinyl ethers (butyl vinyl ether, propyl vinyl ether, etc.), vinyl esters (e.g., vinyl acetate), styrenes (e.g., 4-methylstyrene, styrene, alpha-methylstyrene) are also highly preferred. The more preferred promoters comprise methacrylic or acrylic acid (anhydrides or alkylacrylic acid) copolymers with ethylenically unsaturated comonomers, particularly olefinic copolymers (ethylene, propylene, styrene, butadiene, etc.) which, by themselves, form linear polymer chains. Ethylene-acrylic acid copolymers such as Primacor™ 5990 Polymer are the most preferred.

High cure temperatures are normally needed for curing to produce coatings with improved initial adhesion. Temperatures of at least 280° C., and as high as 550° C. are usually employed. Even at these high curing temperatures, some prior coatings still do not have cross-hatch failures of less than 5%. It is therefore surprising that coating compositions of the present invention can be cured at temperatures of less than about 230° C., substantially lower than normally used, to produce coatings having cross-hatch failures of less than 5%, through the incorporation of adhesion promoters.

Specifically, the powder coating compositions of the present invention have the distinct advantage of having improved initial bond strength to the substrate when cured at 190° C.–230° C.

Inorganic compounds are present in the powder-based compositions in a range from about 10.0% by weight to about 70.0% by weight, and preferably from about 20.0% by weight to about 40.0% by weight, based on the total composition solids. The preferred inorganic compounds are hydrated silicates of aluminum (mica), calcium metasilicate (wollastonite) and their mixtures. Commercially available pigments include Micro Mica® C-3000 from KMG Minerals (King Mountain, N.C.) and Nyad® 325 from Nyco (Willsboro, N.Y.). It is surmised that the inventive coating unique heat resistant properties can be attributed, in-part, to said compounds. For example, it is known that inorganic compounds are often used as fillers to increase the coatings volume and economics. Surprisingly, the present inventors have now discovered that mica and wollastonite significantly increase the coating heat resistance properties. Inorganic fillers such as zinc oxide, zinc borate, barium sulfate, calcium sulfate, calcium carbonate, hydrated silicate of magnesium and anhydrous sodium potassium alumina silicate fail to increase the coatings heat resistance properties. It is further surmised that mica and wollastonite enhance the glycidyl-silanol addition reaction to form a substantially crosslinked network. In addition, these inorganic compounds are especially needed for white coatings. These inorganic compounds preferably have average particle sizes of from about 5–100 microns, more preferably 5–60 microns and most preferably 5–40 microns.

When acrylic polymers are present in the powder-based compositions, they are preferably glycidyl-functional polyacrylic polymers. These glycidyl functional acrylic resins act as curing agents. Suitable resins, if at all present (that is above 0% by weight which may be present) preferably include at least about 5 wt-% to about 100 wt-% glycidyl functionality. These curing agents aid in the curing of the powder coating composition and also, can substantially reduce the condensation reaction which has troubled the prior art. Examples of commercially available glycidyl-functional polyacrylic polymers include Fine-Clad™ A-244A from Reichold Chemicals, Inc. (Research Triangle Park, N.C.), and Almatex PD-7690 from Anderson Development Company (Adrain, Mich.). Said polymers may react with hydroxyl-functional compounds, through an addition mechanism, to form a crosslinked network. Typically a glycidyl-functional acrylic resin is present in an amount effective to allow curing and substantially reduce the condensation of the reaction, preferably in a range from about 5.0% by weight to about 30.0% by weight, and preferably from about 10.0% by weight to about 20.0% by weight, based on the total composition solids. Generally the reaction between the hydroxyl functional resin and the glycidyl functional curing agent is an addition reaction; however, there may be some amount of condensation that occurs between silanol groups which can be tolerated. It will be understood by one of skill in the art that the more glycidyl-functionality in the acrylic resin, the less condensation occurs.

Flow control agents can be present in the powder-based compositions up to about 3.0% by weight, and preferably from about 0.5% by weight to about 1.5% by weight, based on the total composition solids. Composition having about 0% by weight to less than 0.2% by weight flow control agent are also quite useful, as are compositions with less than about 0.15% by weight, less than 0.10% by weight, and less than 0.05% by weight flow control agent. The flow control agents may include acrylics, silicones and fluorine-based polymers. Examples of commercially available flow control agents include Resiflow P-67™ and Clearflow Z-340™ from Estron Chemical, Inc. (Calvert City, Ky.); Mondaflow® 2000 from Monsanto (St. Louis, Mo.); Modarez® MFP from Synthron, Inc. (Morgantown, N.C.); and BYK® 361 and BYK® 300 from BYK Chemie (Wallingford, Conn.). Said agents enhance the compositions melt-flow characteristics and help eliminate surface defects.

As mentioned previously, it is generally believed that a powder coating composition requires the use of flow control agents therein to enable formation of continuous and non-pitted coatings. The coating compositions of the present invention have the additional surprising effect that they do not require the use of any amounts of flow control agents and can perform equally well, even with regard to flow characteristics during melt and cure of the coated powder.

The powder-based compositions may contain additives including adhesion promoters, degassing agents, catalysts, fillers, texturizers, coloring agents, plasticizers, surfactants and their mixtures.

The most preferred thermosetting heat-resistant powder coating composition of the present invention includes a unique combination of hydroxyl-functional silicone resin, a glycidyl functional acrylic resin, an adhesion promoter in an effective amount, and an optional flow control agent (i.e., a flow modifier).

The powder-based compositions of the present invention can have an average particle size in a range from about 10 microns to about 500 microns and preferably from about 10 microns to about 200 microns, more preferably from about 10 microns to about 100 microns, most preferably from about 10 microns to about 70 microns. The particle size is an average diameter as measured by laser diffraction.

The powder coating compositions of the present invention have the distinct advantage of being able to be applied to articles that have varying geometrical shapes and allows for variations in manual spraying. They also can be applied at generally high film builds without significant pitting. By being able to apply the coating at generally a high film build, i.e., at least about 40 microns and preferably at least about 100 microns and the powder coating invariably manages to cover those angles and curves that are generally a challenge to powder coating operations. The compositions of the present invention may be used as thin coating layers (e.g., about 10 to less than 60 microns) where desired. Furthermore, a benefit of being able to apply this coating at a high film build is to accommodate the variety of geometrical shapes of different articles and to allow for variations in manual spraying of the powder coating composition. These coatings exhibit substantially no pitting.

Degassing agents can be used in the powder-based compositions and may be present in a range from about 0.1% by weight to about 5.0% by weight, and preferably from about 0.5% by weight to about 3.0% by weight, based on the total composition solids. Examples of a commercially available degassing agents include Uraflow B from GCA Chemical Corporation (Brandenton, Fla.), Oxymelt A-2™ from Estron Chemical (Calvert City, Ky.), and Benzoin from Generichem Corp. (Little Falls, N.J.). Said materials assist in the release of gases during the curing process.

Small quantities of catalysts may be used in the powder-based compositions which may include stannous octoate, dibutyl tin dilaurate, zinc octoate and their mixtures. Commercially available catalysts include Octaflow ST-70™ from Estron Chemical, Inc., (Calvert City, Ky.); and Actiron DBT™ from Synthron (Morgantown, N.C.). The catalysts may be present in a range from about 0.01% by weight to about 5.0% by weight, and preferably from about 0.1% by weight to about 3.0% by weight, based on the total composition solids. The catalysts are used to enhance the curing characteristics of the powder-based compositions.

If desired, other inorganic fillers can be used in combination with the preferred inorganic compounds of the present invention. Suitable examples include zinc oxide, calcium carbonate, magnesium silicate (Talc), calcium sulfate, barium sulfate, zinc borate, anhydrous sodium potassium alumino silicate, calcium sulfate, calcium carbonate and their mixtures. Commercially available fillers are Duramite® from ECC International (Atlanta, Ga.), Vicron® 41-8 from Specialty Minerals, Inc. (New York, N.Y.) and CA-5 from U.S. Gypsum Co. (Chicago, Ill.). The fillers may be present in a range from about 10.0% by weight to about 50.0% by weight, and preferably from about 20.0% by weight to about 40.0% by weight, based on the total composition solids. The fillers can be used to provide texture, control gloss and increase the coatings volume to enhance its economics.

If desired, texturizers can be used in the powder-based compositions and include polytetrafluoroethylene, rubber, glass grit, talc and their mixtures. A commercially available texturizer includes Shamrock SST-3 from Shamrock Technologies (Newark, N.J.). The texturizer may be present in a range from about 1.0% by weight to about 10.0% by weight, and preferably from about 2.0% by weight to about 7.0% by weight, based on the total composition solids.

Coloring agents can be used in the powder-based compositions and any heat stable coloring agent may be used. The preferred coloring agents are black mixed metal oxides. Commercially available coloring agents include Black No. 101 from the Shepard Color Company (Cincinnati, Ohio). The coloring agent may be present in a range from about 1.0% by weight to about 25.0% by weight, and preferably from about 5.0% by weight to about 15.0% by weight, based on the total composition solids.

Plasticizers may be used in the present invention to provide flexibility. Plasticizers may include polymeric resins, elastomers, waxes, oils and their mixtures. The plasticizers may be present in a range from about 1.0% by weight to about 15.0% by weight, and preferably from about 5.0% by weight to about 10.0% by weight, based on the total composition solids.

Surfactants can be used and may include inorganic polyphosphates, organic polyacids, nonionic block copolymers and their mixtures. The surfactants may be present in a range from about 0.5% by weight to about 3.0% by weight, and preferably from about 1.0% by weight to about 2.0% by weight, based on the total composition solids. The surfactants are useful as dispersing agents for the inorganic compounds and inorganic fillers.

Fluidizing agents can be used to improve the dry-flow characteristics of the powder-based compositions. Examples include fumed silica, alumina oxides and their mixtures. The fluidizing agent can be present in a range from about 0.05% by weight to about 1.0% by weight, and preferably from about 0.1% by weight to about 0.5% by weight, based on the total composition solids.

In the inventive method, for the preparation of heat resistant protective coatings, the powder-based materials are combined and agitated to form a dry blend. The blend is melt mixed in an extruder, at a temperature less than about 130° C., and cooled to form solid particulate. Fluidizing agents may be added at this stage of the process to enhance the materials dry-flow characteristics. Lower temperatures reduce melt coagulation and enhance the grinding process.

Preferably, the particulate is ground at a temperature less than about 20° C. Said compositions may be applied on a substrate through electrostatically spraying or with a fluidized bed method. The coated substrate is then heated to a temperature in a range from about 140° C. to about 260° C., and preferably from about 180° C. to about 230° C., and more preferably from about 190° C. to about 215° C. It is generally known that elevated temperatures can accelerate a materials reactivity. For example, a reference describing the frequency of bond formation is described in "Organic Chemistry", T. W. Graham Solomons, second edition, pages 139–141. Briefly, the collision theory of reaction rates describes how the rates of chemical reactions are directly proportional to the collision frequency. In the present invention, it is surmised elevated temperatures increase the frequency and extent of addition and/or condensation reactions to form a crosslinked polymer matrix.

The protective coatings can have a film thickness in a range from about 25 microns to about 255 microns, and preferably from about 40 microns to about 200 microns, most preferably from about 50 microns to about 150 microns. A higher-film-build can enhance the coating process and increase the protective coatings film thickness to provide an extra barrier of protection. For example, during manual and automated spraying applications it is often necessary to deposit a high-film-build to assure a complete deposition of the particles on the substrate. Additionally, a protective coating comprising a film thickness greater than about 100 microns is preferred in that such a high-film-build can enhance the coatings resistance to abrasion and environmental corrosives.

The protective coatings provide excellent heat resistant properties and are particularly useful on articles which are subjected to elevated temperatures including stacks, mufflers, manifolds, boilers, ovens furnaces, steam lines, heat exchangers, barbecue equipment and cooking utensils.

Other optional elements are added to further enhance the properties of this composition.

The present invention is further illustrated, but not limited to, the following examples.

EXAMPLES

The following test methods were used:
Tape Pull Test Method (TPTM)

Aluminum cast coupons were electrostatically sprayed with powder-based compositions and heated in an electric oven for 13 minutes at 218° C. The samples were subjected to a temperature between 340° C.–399° C. and tested at about 40 hours and at about 500 hours. After heating, the samples were cooled to ambient room temperature and aged for at least one hour. The samples were then covered with a piece of Scotch® Brand "8919" tape from 3M Company (St. Paul, Minn.) and firmly applied using hand pressure. The tape was quickly removed, using a 90° peel mode, and visually inspected for signs of coating failure. The protective coating passes the TPTM when said coating is not transferred to the tape.
Outgassing Test Method (OTM)

The OTM is used to determine the maximum film thickness at which a powder-based composition can be applied and cured without showing coating defects from escaping gases. A 10.16 cm×30.48 cm steel panel was coated with a powder-based composition wherein the coating thickness was gradually increased from about 25 microns to about 255 microns. The panel was heated to a temperature of about 220° C. for 13 minutes and visually inspected for defects. The protective coating passes the OTM, through visual examination, when said coating is free of defects including pinholes, cracks and craters.
Cross-Hatch Adhesion Test Method (CATM)

Aluminum cast coupons were electrostatically sprayed with powder-based compositions and heated in an electric oven for 15 minutes at 204° C. The samples were cooled to room temperature and aged for at least one hour. The sample was then scored with a single edge razor blade through the coating into a grid of 5×5 lines spaced about 2 mm apart. The grid was brushed clean and covered with a piece of Scotch® Brand 8919 tape from 3M Co. (St. Paul, Minn.) and firmly applied using hard pressure. The tape was quickly removed using a 90° peel mode. The grid area was evaluated for the amount of coating adhesion loss.

Examples

The following examples are offered to further illustrate the various aspects and attributes of the present invention. These examples should only be construed as illustrative. They are not intended to limit the scope of the present invention.
Preparation of Formulations A–E Formulas A–E were all prepared in the same way. The amounts of each material as measured in parts per hundred resin (PHR), differs as set forth in Table 1.

All the materials were dry blended together. The mixture was then extruded in a single screw extruder at temperatures of about 38 degrees C., in the first zone and about 66 degrees C. in the second zone. The extruded material was then cooled. After cooling, 0.2 wt-% aluminum oxide was added to the extrudate. The aluminum oxide was added to the extrudate to allow the powder coating to flow freely. The resulting material was then ground at room temperature on a M-20 grinder and sifted through a 140 mesh screen. The dry coating was then electrostatically sprayed onto an aluminum cast coupon and cured in an electric oven for fifteen (15) minutes at 204 degrees C. The coating was then subjected to the test described above.

TABLE 1

|  | A | B | C | D | E |
|---|---|---|---|---|---|
| Dow Corning 1-0543 | 50.0 | 50.0 | 100.0 | 100.0 | 50.0 |
| Dow Corning Z-6018 | 30.0 | 10.0 | — | — | 30.0 |
| Fine Clad A-244-A | 20.0 | 20.0 | — | — | 20.0 |
| Resiflow P-67 | 1.4 | 1.4 | 1.4 | 1.4 | — |
| Uraflow B | 1.0. | 1.0 | 1.0 | 1.0 | — |
| Octaflow ST-70 | 0.75 | 1.0 | 0.26 | 0.26 | 1.0 |
| Primacor 5990 | 0.5 | — | 1 | — | 0.75 |
| Nyad 325 | 110.0 | 110.0 | 110.0 | 110.0 | 60.0 |
| Vicron 41-8 | 70.0 | 70.0 | 70.0 | 70.0 | 50.0 |
| CA-5 | — | — | — | — | 60.0 |
| Black 101 | 30.0 | 30.0 | 30.0 | 30.0 | 17.5 |
| SST-3 | — | 0.5 | — | — | — |

TABLE 2

|  | Example A | Example B | Example C | Example D | Example E |
|---|---|---|---|---|---|
| TPTM | Pass >300 hr | Pass >300 hr | Pass >300 hr | Pass >300 hr | Pass >300 hr |
| OTM (Microns) | 200 | 200 | 200 | 200 | 200 |
| CATM (% Lost) | 0% lost | 15% | 5% | 25% | 0% |

What is claimed is:

1. A protective coating formed from a powder-coating composition comprising:
   1) at least one polysiloxane;
   2) from about 0.01 to about 10% by weight of the polymer content of at least one adhesion promoter; and
   3) at least at least one inorganic compound selected from the group consisting of hydrated silicates of aluminum, calcium metasilicate and mixtures thereof.

2. The protective coating of claim 1 wherein said protective coating formed has a cross-hatch adhesion failure of less than 5%.

3. The protective coating of claim 1 wherein said adhesion promoter is selected from a group consisting of (meth) acrylic polymers and copolymers.

4. The protective coating of claim 1 wherein said polysiloxane comprises a hydroxyl-functional silicone resin.

5. The protective coating of claim 4 wherein the hydroxyl-functional silicone resin is selected from the group consisting of dimethyl, diphenyl, phenylpropyl and methyl-phenyl silicone resin.

6. The protective coating of claim 1 wherein the composition comprises less than 0.15% by weight of any flow control agent.

7. The protective coating of claim 3 wherein said copolymer comprises an ethylene or propylene copolymer of a (meth)acrylic resin.

8. The protective coating of claim 7 wherein said copolymer is ethylene/acrylic copolymer.

9. A powder coating composition comprising:
   1) at least one hydroxyl-functional silicone resin;
   2) from about 0.01 to about 10% by weight of the polymer content of at least one adhesion promoter; and
   3) at least one inorganic compound selected from the group consisting of hydrated silicates of aluminum, calcium metasilicate and mixtures thereof.

10. The powder coating composition of claim 9 further comprising an accelerator comprising stannous octoate.

11. A protective coating formed from a powder coating composition comprising:
   1) at least one acrylic polymer;
   2) at least one polysiloxane; and
   3) at least one inorganic compound selected from the group consisting of hydrated silicates of aluminum, calcium metasilicate and mixtures thereof, wherein said coating composition is free of flow agents.

12. The protective coating of claim 11 further comprising an adhesion promoter.

13. The protective coating of claim 11 wherein said acrylic polymer is a glycidyl functional acrylic resin.

14. The protective coating of claim 13 wherein said glycidyl functional resin is selected from a group consisting of a glycidyl functional acrylic resin, a glycidyl functional methacrylic resin and mixtures thereof.

15. A method of coating an article comprising the steps of:
   1) providing a powder coating composition comprising:
      a) at least one glycidyl-functional polyacrylate;
      b) at least one hydroxyl-functional polysiloxane;
      c) at least one inorganic compound selected from the group consisting of hydrated silicates of aluminum, calcium metasilicate and mixtures thereof; and
      d) at least one adhesion promoter; and
   2) coating said composition on a substrate and heating to a substrate temperature greater than about 205° C. for about 20 minutes.

16. A heat-resistant thermosetting powder coating composition comprising:
   1) at least one hydroxyl-functional silicone resin;
   2) at least one glycidyl functional acrylic resin; and
   3) at least one inorganic compound selected from the group consisting of hydrated silicates of aluminum, calcium metasilicate and mixtures thereof; said powder coating composition is free of flow control agents.

17. The composition of claim 16 further comprising at least one adhesion promoter.

18. The composition of claim 17 wherein said adhesion promoter comprises a (meth)acrylic copolymer.

19. A method of coating an article comprising the steps of:
   1) providing a powder coating composition comprising
      a) at least one polysiloxane,
      b) from about 0.01 to about 10% by weight of the polymer content of at least one adhesion promoter, and
      c) at least one inorganic compound selected from the group consisting of hydrated silicates of aluminum, calcium metasilicate and mixtures thereof; and
   2) coating said composition on a substrate and heating to a substrate temperature greater than about 205° C. for about 20 minutes.

20. An article comprising a substrate, and coated on at least one surface of said substrate is a coating formed from the method of claim 19, said coating having a cross-hatch adhesion failure of less than 5%.

21. The article of claim 20 wherein said coating has a thickness of at least about 40 microns.

* * * * *